United States Patent [19]

Goossens et al.

[11] Patent Number: 5,642,042
[45] Date of Patent: Jun. 24, 1997

[54] ROTARY MOTION MEASURING DEVICE WITH A ROTATING SIGNAL GENERATOR RING AND A STATIONARY SNUGLY FITTED SENSOR WITH A PROTECTIVE HOUSING AROUND THE GENERATOR RING

[75] Inventors: Andre F. L. Goossens, Rumst; Edmond DeVolder, Sint-Niklaas, both of Belgium

[73] Assignee: ITT Automotive Europe GmbH, Germany

[21] Appl. No.: 256,210

[22] PCT Filed: Nov. 25, 1992

[86] PCT No.: PCT/EP92/02714

§ 371 Date: Jun. 24, 1994

§ 102(e) Date: Jun. 24, 1994

[87] PCT Pub. No.: WO93/13424

PCT Pub. Date: Jul. 8, 1993

[30] Foreign Application Priority Data

Dec. 24, 1991 [DE] Germany ............ 41 42 991.5
Mar. 5, 1992 [DE] Germany ............ 42 06 910.6

[51] Int. Cl.⁶ .................... G01P 3/48; F16C 19/08
[52] U.S. Cl. .............. 324/173; 324/207.25; 384/448
[58] Field of Search .................... 324/173, 207.25, 324/174, 166, 207.14, 207.17; 384/624, 448, 486; 310/155, 168; 340/682

[56] References Cited

U.S. PATENT DOCUMENTS

| | | | |
|---|---|---|---|
| 4,864,231 | 9/1989 | Okumura et al. | 324/173 |
| 4,988,220 | 1/1991 | Christiansen et al. | 324/207.25 |
| 5,004,980 | 4/1991 | Ida et al. | 324/207.25 |
| 5,011,302 | 4/1991 | Mott et al. | 324/207.25 |
| 5,011,303 | 4/1991 | Caron | 324/207.25 |
| 5,123,755 | 6/1992 | Faye et al. | 324/207.25 |
| 5,127,747 | 7/1992 | Hilby et al. | 324/207.25 |
| 5,129,741 | 7/1992 | Deane | 324/207.25 |
| 5,131,763 | 7/1992 | Caron | 324/207.25 |

FOREIGN PATENT DOCUMENTS

| | | |
|---|---|---|
| 0424185 | 4/1991 | European Pat. Off. . |
| 0448062 | 9/1991 | European Pat. Off. . |
| 0453067 | 10/1991 | European Pat. Off. . |
| 0454547 | 10/1991 | European Pat. Off. . |
| 0462435 | 12/1991 | European Pat. Off. . |
| 0521693 | 1/1993 | European Pat. Off. . |
| 2659450 | 9/1991 | France . |
| 2243331 | 3/1974 | Germany . |
| 2520855 | 5/1975 | Germany . |
| 3118864 | 10/1982 | Germany . |
| 3229207 | 4/1984 | Germany . |
| 3613135 | 10/1987 | Germany . |
| 8815130 | 2/1989 | Germany . |
| 3809886 | 10/1989 | Germany . |
| 9010131 | 10/1990 | Germany . |
| 3930702 | 3/1991 | Germany . |
| 4032476 | 4/1991 | Germany . |
| 4005709 | 9/1991 | Germany . |
| 4012480 | 10/1991 | Germany . |
| 4033860 | 4/1992 | Germany . |
| 2225398 | 5/1990 | United Kingdom . |

*Primary Examiner*—Sandra L. O'Shea
*Assistant Examiner*—Jay M. Patidar
*Attorney, Agent, or Firm*—J. Gordon Lewis; Thomas N. Twomey

[57] ABSTRACT

A device for measuring rotary motion, preferably the rotational speed of the vehicle wheels, has a signal generator ring mounted on a wheel bearing outer ring which rotates with the wheel. A protective housing is mounted to a stationary member and surrounds the signal generator ring. A sensor which is snug-fittingly accommodated in a holder is fixed onto the stationary member by way of a flange on the protective housing. The holder holds and retains the sensor in the predetermined position on the periphery of the signal generator ring.

9 Claims, 3 Drawing Sheets

ROTARY MOTION MEASURING DEVICE WITH A ROTATING SIGNAL GENERATOR RING AND A STATIONARY SNUGLY FITTED SENSOR WITH A PROTECTIVE HOUSING AROUND THE GENERATOR RING

This application is a 371 of International Application Ser. No. PCT/EP92/02714, filed on Nov. 25, 1992.

TECHNICAL FIELD

This invention relates to devices for measuring rotary motions and more particularly to rotary measurement devices consisting of a signal generator ring, a stationary sensor generating an electric signal representing the rotary motion of the signal ring, and of a sensor holder.

BACKGROUND OF THE INVENTION

Measuring rotary motions and, in particular, the speed and the rotational behavior of the individual vehicle wheels is of great importance in connection with automotive vehicle control systems such as systems for anti-lock control brake systems (hereinafter ABS), traction slip control, and suspension control, etc. Sensors for these types of applications must be durable, reliable, inexpensive to manufacture, easy to assemble, easy to diagnose, replace, and maintain.

There already exists a multitude of sensor types and sensor designs. Commercially available vehicles with electronically controlled anti-lock and traction slip control systems are primarily with inductive wheel sensors. These sensors are arranged on the periphery of a toothed disk rotating with the wheel. Inductive sensors generate a magnetic field.

As the toothed disk moves past the sensor, the magnetic field is modulated and a voltage is induced inside a coil within the sensor. The frequency and amplitude of the voltage allows measurements of rotary motion. As a rule, however, only the frequency or change in frequency is evaluated for determining the wheel speed.

Sensors of this type are relatively expensive and intricate. They require precise adjustment as a certain air gap must be maintained. The electric connection, the mechanical strength of the wires and the screening, the soiling and damaging of the toothed disks, corrosion, penetration of humidity etc. provide problems. Maintaining the necessary space requirements between the sensor and the toothed disk likewise often creates problems.

There are also known so-called wheel bearing sensors where the sensor and the pulse generator ring or the toothed disk are integrated into the wheel bearing. Thus the space constraints on the bearing style sensor size are highly demanding. Moreover, advantages are associated with bearing style sensors with regard to the expenditure of manufacture and assembly. A disadvantage is the poor accessibility of the built-in sensor which complicates sensor repair or replacement.

It is an object of this invention to overcome the disadvantages of known bearing style speed sensors for measuring rotary motions and to develop a measuring device characterized above all by a simple structure as well as by a comparatively small expenditure in terms of manufacture and assembly. Dismantling or replacing the sensor for purposes of checking or repair is made relatively easy.

This object is obtained by designing a sensor in the form of a plug or plug-like component and the sensor holder is designed in the form of a stationary sensor-accommodating housing which accommodates the sensor, positions the sensor at the signal generator ring, and keeps it in this position.

In accordance with a preferred embodiment of the present invention, the sensor is held in the sensor-accommodating housing by a snug fit, press fit, click-in mechanism, by a plug connection or by a similar measure. This allows the sensor to be assembled and dismantled with minimal effort.

Preferably, the sensor-accommodating housing has a recess at the point where the sensor will interact with the signal generator ring so that, for instance, a small air gap can be adjusted between the sensor or the pole shoe of a sensor and the passing teeth of a toothed disk (which serves as signal generator ring). With a closed housing the material thereof is selected so that the passage of the field lines whose change is evaluated for measuring the rotary motion will be minimally obstructed.

The present inventive measuring device allows a particularly advantageous design in the form of an active or passive wheel bearing sensor. In this case, the signal generator ring consists of evenly distributed teeth or corresponding recesses, arranged at or on a wheel bearing ring (e.g. on an outer ring of a wheel bearing which rotates with the wheel). The sensor holder is preferably mounted on the stationary wheel axle by means of a lateral flange, a corresponding ring, a disk or the like.

In a further embodiment of the present wheel bearing sensor, a stationary protective housing is provided which partially or completely surrounds the signal generator ring and which houses the sensor-accommodating housing and which, by way of a lateral flange or the like, is connected with the stationary wheel axle or a stationary part of the wheel support or wheel bearing such as the inner ring of the bearing.

In the present invention the plug-like structure of the sensor will prove particularly favorable because the sensor is easily mounted and dismantled on the wheel bearing despite the typical space constraints.

In another embodiment of the present invention, the sensor is shaped in the form of an oblong body (such as that of a pin) with a round, an angular rounded cross-section or in the form of a corresponding pin with a stepped cross-section. These structures promote the insertion and dismantling of the sensor in the sensor-accommodating housing.

According to this invention, the sensor can be positioned either parallel to the axis of rotation or wheel bearing axis or at an acute angle with regard to the same. This enables an optimal adaptation to the available space.

Another essential advantage of a wheel bearing sensor constructed in accordance with this invention consists in that the sensor will, at most, have a minimal influence on the construction of the bearing. This enables the same bearing design to be used both with and without a speed sensor which, for instance, will have a favorable influence on the manufacturing cost of the vehicle because only one bearing design needs to be stocked.

The plug-type design of the sensor of the present invention enables a permanent connection between the connecting cable and the sensor. No coupling is needed which, at the wheel, would require a special high reliability and, hence, an expensive construction because of the vibrations ensuing at the wheel. If a plug coupling is convenient, it will be possible to relocate the same to a safe spot remote from the wheel bearing sensor.

DETAILED DESCRIPTION OF THE INVENTION

Figure 1:
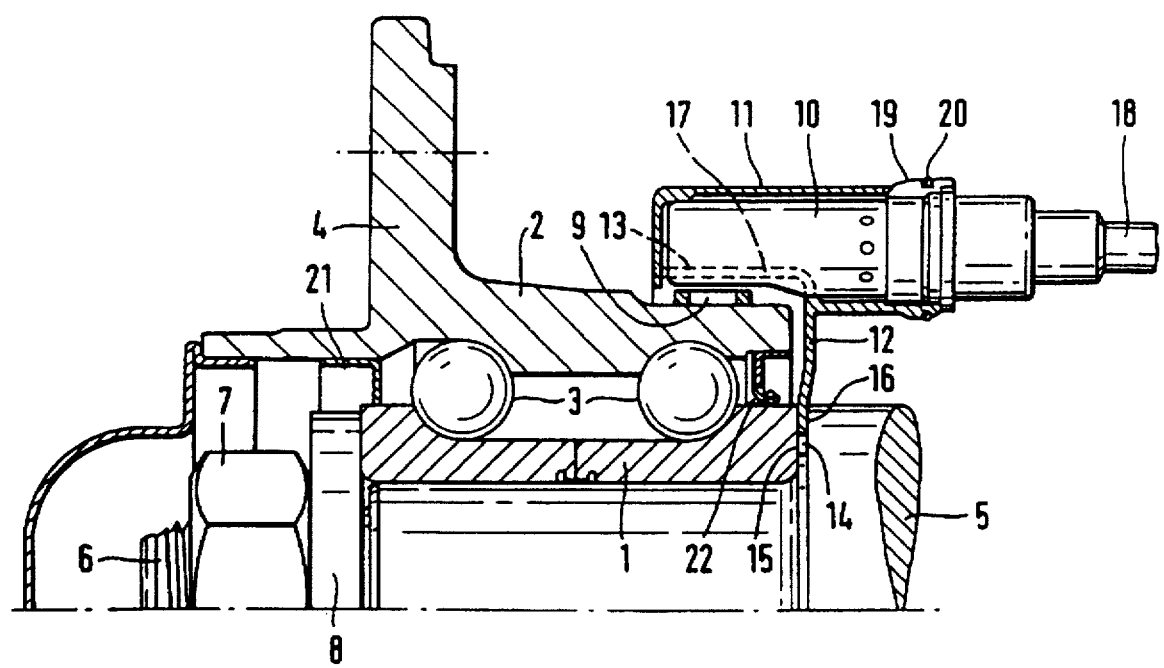
FIG. 1 is a partial cross-sectional view of a wheel bearing with a wheel bearing sensor of the present invention.

In accordance with FIG. 1, a wheel bearing provided for an automotive vehicle has an inner ring 1 and an outer ring 2. The two rings 1, 2 of the bearing are separated by balls 3. The remaining components of the bearing such as the packings 21, 22 on both sides are only symbolically sketched in FIG. 1. A wheel flange 4 is moulded to the outer ring 2 of the bearing and serves to fasten the brake disc and the wheel in the known manner not illustrated here.

The inner ring 1 of the bearing is seated on a stationary stepped shaft or wheel axle 5. The wheel axle 5 ends in a screw bolt 6 receiving a nut 7 which, by way of a washer 8, establishes a firm connection between the (multi-part) inner ring 1 of the bearing and the axle 5.

It is particularly advantageous to firmly connect the flange 12 to the stationary inner ring 1 of the bearing. Such a constructional design enables a "signal generation" function to be checked before assembly.

The inventive measuring device which, here, is designed as a wheel bearing sensor is composed of a signal generator ring 9, a sensor 10 and a sensor holder. Said sensor holder is comprised of a sensor-accommodating housing 11 fastened to the wheel axle 5 by means of the lateral flange 12.

The actual transducer or sensor 10 is preferably integrated in one piece with a screened (or shielded) connecting cable 18 and is slid into the sensor-accommodating housing 11. The inside space of the housing 11 and the outside contour of the sensor 10 are adapted to each other (or keyed) so that the sensor 10 will automatically adopt its provided position in the housing 11 and, hence, in relation to the signal generator disk 9. A latch 19, which in this case is arranged on the sensor 10, and a stop spring 20, in this case arranged on the housing 11, ensure that the sensor 10 is axially positioned and retained within the sensor-accommodating housing 11.

In the example of an embodiment as per FIG. 1, a stationary protective housing 13 surrounds the signal generator ring 9. Appertaining to this protective housing is the holding flange or lateral flange 12 which, here, has the design of a ring arranged perpendicularly to the axis of rotation.

This ring is clamped in and thus held between a front face 15 of the stationary inner ring 1 of the wheel bearing and a parallel surface 16 formed by stepping or cross-section expansion of the wheel axle 5. Mounted to this ring or lateral flange 12 is a part 17 which is shaped like a hollow cylinder and overlapping the signal generator ring 9.

The protective housing 13 which, here, consists of parts 12 and 17 simultaneously serves in this example to hold the sensor-accommodating housing 11. To this end, this housing 11 is directly mounted on a wall of the hollow-cylinder-type protective housing part 17, which reaches out beyond the signal generator ring 9, and is connected with the same so as to form one piece. The wall 17 of the protective housing 13 is cut on the level of this sensor-accommodating housing 11 so that, in this spot, the inserted sensor 10 will come into operative contact with the signal generator ring 9.

The protective housing 13, more specifically its lateral flange 12, is provided with a positioning lip or positioning rib 14 engaging a corresponding notch or recess in the stationary parts, namely in the wheel axle 5 and/or in the inner ring 1 of the bearing. This fixes the angular position of the lateral flange 12 and, thus, of the sensor-accommodating housing 11 and, ultimately, of the sensor 10 in the plane of rotation.

Figure 2:
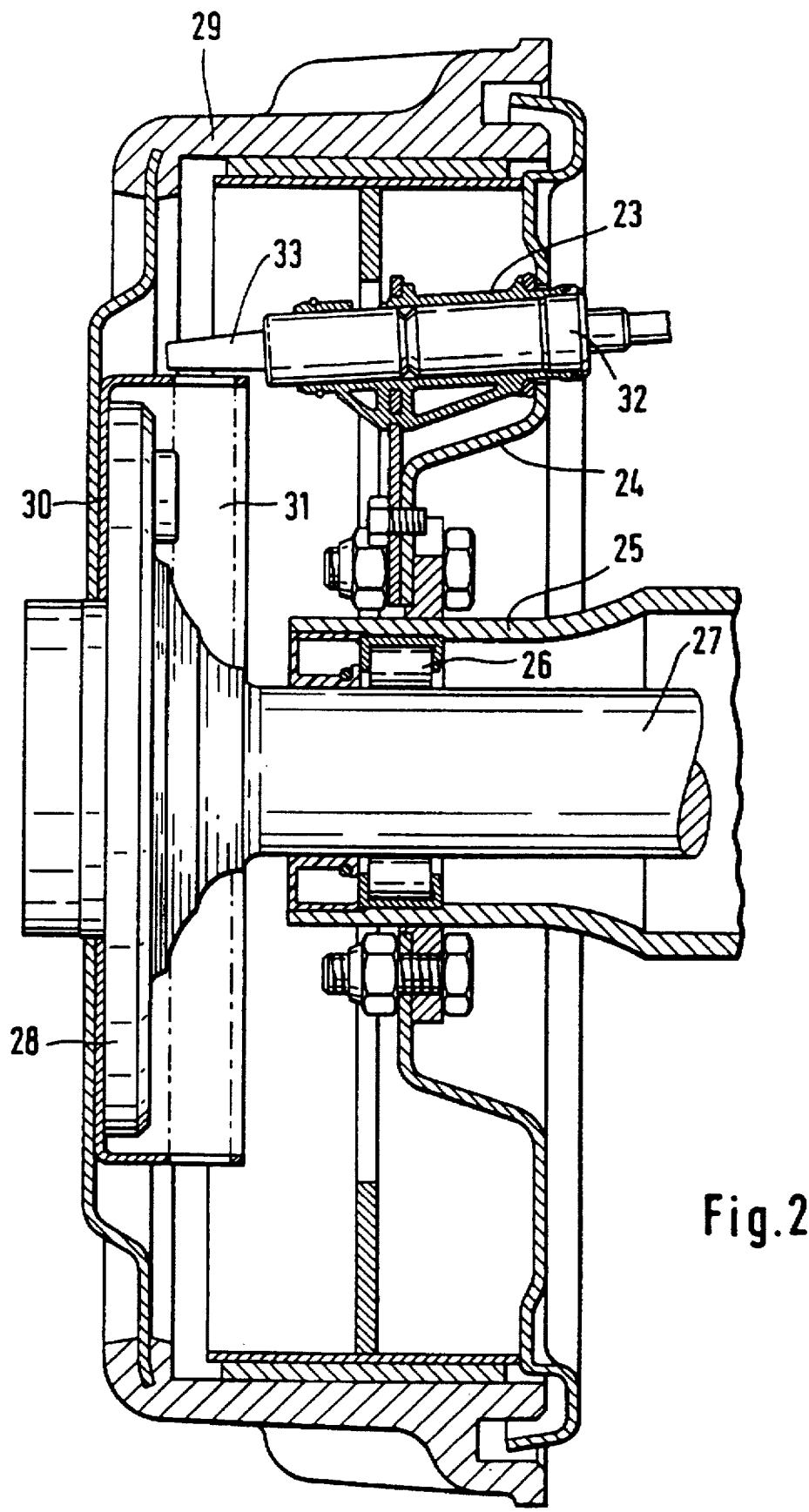
FIG. 2 is a cross-sectional view of a second embodiment of a measuring device of the present invention.

FIG. 2 illustrates the assembly of the inventive measuring device into the brake drum of the wheel of an automotive vehicle.

In this example of an embodiment, a sensor-accommodating housing 23 is built into the bearing plate 24 of the represented wheel. With a roller bearing 26 inserted, a shaft 27 is rotatably supported within the steering knuckle 25 of the wheel whereto the bearing plate 24 is fastened. Said shaft 27 carries a wheel flange 28. Mounted on this wheel flange are a brake drum 29 and the non-illustrated rim of a vehicle wheel.

Within the brake drum 29, a signal generator or pulse generator ring 31 is mounted to a flange 30. Such a pulse generator ring, for instance, consists of a wheel or disk the periphery of which tangentially or laterally, depending on the arrangement and design of the sensor, is provided with teeth or notches evenly distributed over said periphery.

As in the example of an embodiment as per FIG. 1, a sensor 32 designed as a plug is seated in the sensor-accommodating housing 23. The sensor 32 will be positioned and held in the provided position by means of a click-in mechanism, snap lock, snug fit or in a similar way when it is plugged into the sensor-accommodating housing 23. The relative motion of the teeth of the pulse generator ring 31 with regard to the sensor 32 or to the pole shoes 33 of this sensor is transformed by means of the sensor 32 into an electric signal representing the wheel motion.

As can be gathered from the drawing, the signal generator ring 31 and the sensor 32 in the example of an embodiment as per FIG. 2 are also arranged so as to be protected from mechanical influences and from soilings. The actual sensor body of sensor 32 allows easy and quick assembly and exchange due to the plug design of this sensor and to the arrangement in a corresponding plug-accommodating housing (23). There will automatically ensue a very accurate positioning.

The sensor features an exactly parallel arrangement with regard to the axis of rotation in the example of an embodiment as per FIG. 1 and an almost parallel arrangement with regard to this axis in the example of an embodiment as per FIG. 2. Because of easier assembly or improved accessibility, in some instances it might be an advantage to arrange this sensor at an acute angle with regard to the axis of rotation.

Figure 3:
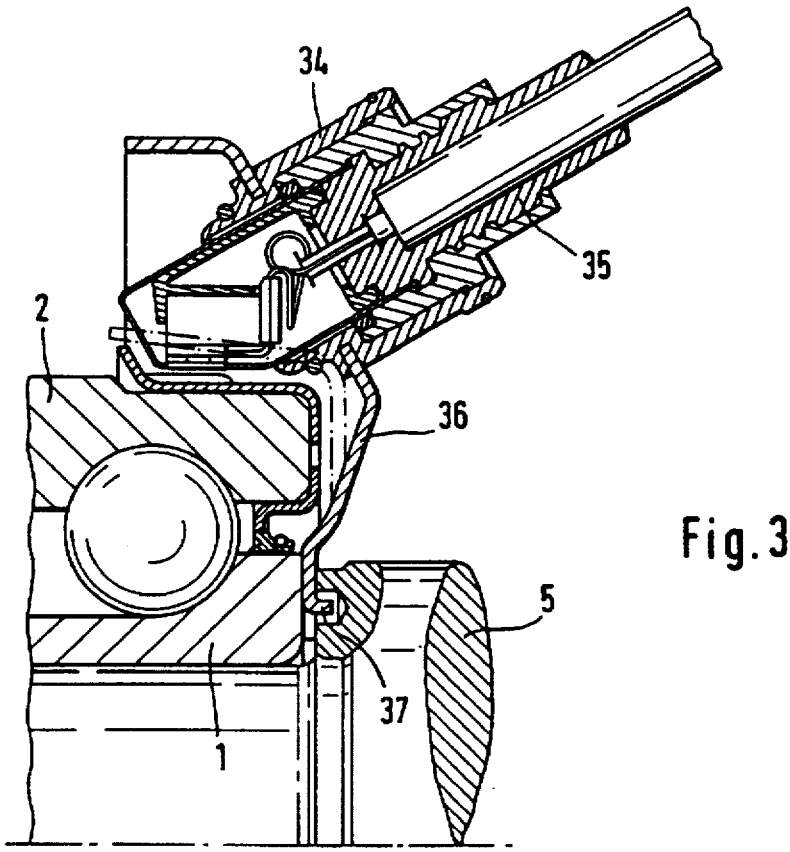
FIG. 3 is a partial cross-sectional view of a third embodiment of the present invention showing an acute-angled arrangement in respect of the wheel bearing axis.

FIG. 3 illustrates an example of an embodiment of this invention where a sensor-accommodating housing 34 and, thus, the appertaining sensor 35 are built in at an acute angle with regard to the axis of rotation. For the rest, the embodiment as per FIG. 3 is a wheel bearing sensor which largely corresponds to the arrangement of FIG. 1. Again, a lateral flange 36 is provided for holding the sensor-accommodating housing 34. The lateral flange 36 is connected with the stationary wheel axle 5 and the stationary inner ring 1 of a wheel bearing. A positioning lip 37 fixing the angular position in the plane of rotation is likewise sketched out.

Figure 4:
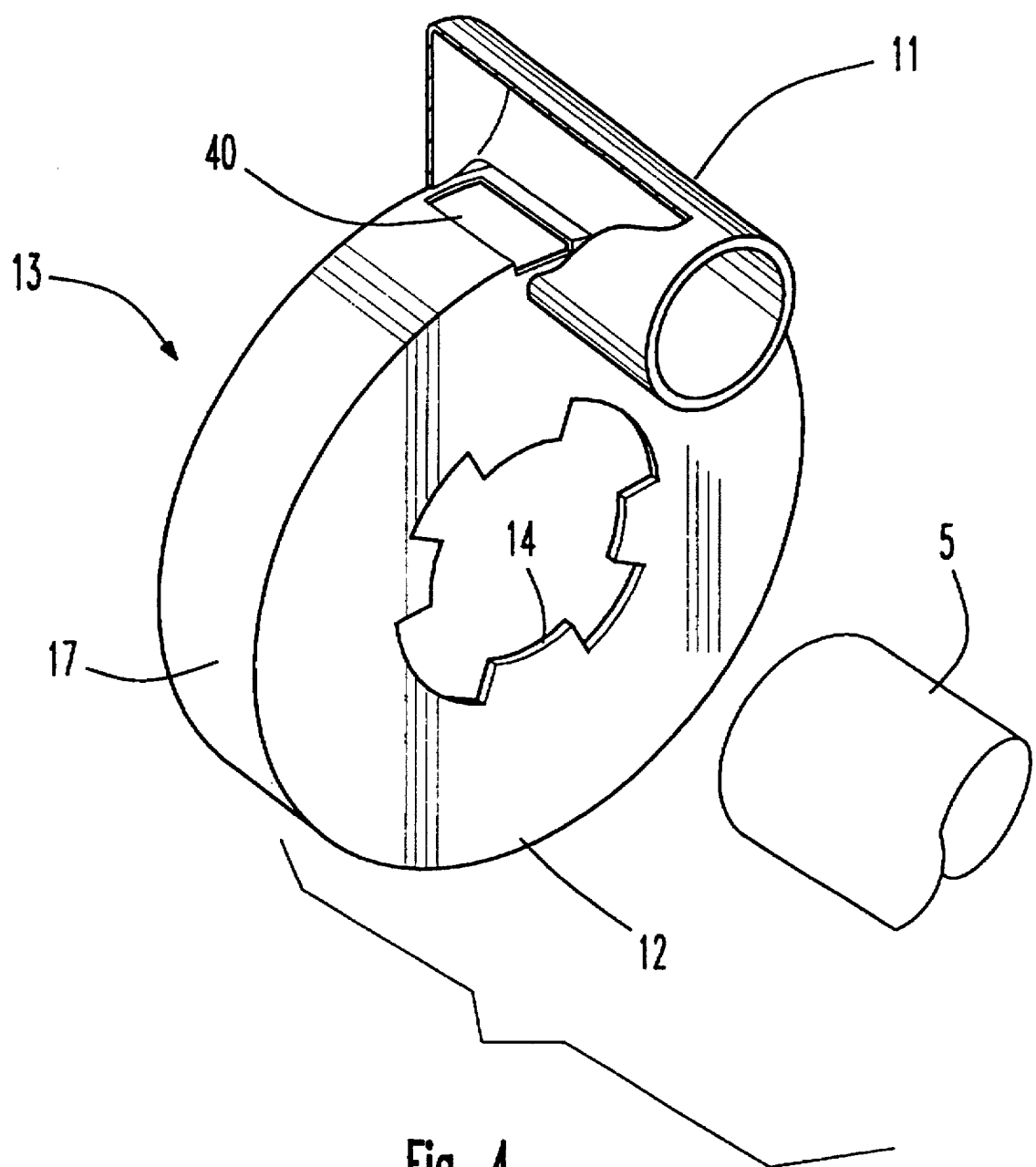
FIG. 4 is a sketch of a protective housing according to the instant invention.

FIG. 4 is a sketch of a protective housing 13 showing an opening 40 in hollow cylinder protective housing part 17 with sensor holder 11 shown located above opening 40.

We claim:

1. A rotary motion measuring device comprising:

a stationary member, a rotating member rotatably coupled to said stationary member wherein said rotating member includes a signal generator ring, a protective housing attached to said stationary member, wherein said protective housing substantially surrounds said signal generator ring and includes an opening on an outer periphery of said protective housing;

a sensor holder coupled to said protective housing with a sensor head disposed in front of said generator ring to receive a signal from said generator ting through said opening of said protective housing, a sensor disposed in said sensor holder opening, said sensor disposed proximate said signal generator ring such that it generates an electric signal representative of the rotary motion of the signal generator ring.

2. The device of claim 1, wherein the sensor is positioned and held within said sensor holder opening by at least one of a snug fit, press fit, click-in mechanism, and a plug connection.

3. The device of claim 1, wherein said protective housing includes a lateral flange portion, wherein said sensor holder is coupled to said lateral flange portion of said protective housing.

4. The device of claim 3, wherein said lateral flange portion includes positioning lips and wherein said stationary member includes recesses corresponding to said lips, wherein said lips and said corresponding recesses engage one another fixing an angular position of both the lateral flange and the sensor holder with respect to the stationary member.

5. The device of claim 1, wherein the sensor is designed in the form of an oblong body having at least one of a round, an angular, and a rounded angular cross-section.

6. The device of claim 1, further including a latch and a stop spring fitted between said sensor and said sensor holder for positively fixing the sensor in the sensor holder.

7. The device of claim 1, wherein said opening is a passageway through said protective housing.

8. A rotary motion measuring device comprising:

a stationary member;

a rotating member rotatably coupled to said stationary member wherein said rotating member includes a signal generator ring;

a sensor holder coupled to said stationary member including an opening therein;

a sensor disposed in said sensor holder opening, said sensor disposed proximate said signal generator ring such that it generates an electric signal representative of the rotary motion of the signal generator ring;

a protective housing attached to said stationary member, wherein said protective housing at least partially surrounds said signal generator ring and allows passage of a signal from said generator ring to said sensor;

wherein said protective housing includes a lateral flange portion, wherein said sensor holder is coupled to said lateral flange portion of said protective housing; and wherein said lateral flange portion includes positioning lips and said stationary member includes recesses corresponding to said lips, wherein said lips and said corresponding recesses engage one another fixing an angular position of both the lateral flange and the sensor holder with respect to the stationary member.

9. A rotary motion measuring device comprising:

a stationary member;

a rotating member rotatably coupled to said stationary member wherein said rotating member includes a signal generator ring;

a protective housing attached to said stationary member, wherein said protective housing at least partially surrounds said signal generator ring and allows passage of a signal from said generator ring to said sensor;

a sensor holder coupled to said stationary member including an opening therein; a sensor disposed in said sensor holder opening, said sensor disposed proximate said signal generator ring such that it generates an electric signal representative of the rotary motion of the signal generator ring; and a latch and a stop spring fitted between said sensor and said sensor holder for positively fixing the sensor in the sensor holder.

* * * * *

UNITED STATES PATENT AND TRADEMARK OFFICE
CERTIFICATE OF CORRECTION

PATENT NO. : 5,642,042
DATED : 06/24/97
INVENTOR(S) : Goossens, et al.

It is certified that error appears in the above-indentified patent and that said Letters Patent is hereby corrected as shown below:

Column 5, line 14, change "ting" to --ring--.

Column 6, line 35, before "a sensor" should start a new paragraph.

Signed and Sealed this

Twenty-sixth Day of August, 1997

Attest:

BRUCE LEHMAN

Attesting Officer

Commissioner of Patents and Trademarks